W. H. EMOND.
MOTOR VEHICLE BODY AND SEAT ARRANGEMENT.
APPLICATION FILED JUNE 13, 1913.

1,250,155.

Patented Dec. 18, 1917.
2 SHEETS—SHEET 1.

Witnesses:
Chas. H. Young
J. B. Pickard

Inventor
William H. Emond,
By Attorneys
Parouet Hall & Bodell.

W. H. EMOND.
MOTOR VEHICLE BODY AND SEAT ARRANGEMENT.
APPLICATION FILED JUNE 13, 1913.
1,250,155.
Patented Dec. 18, 1917.
2 SHEETS—SHEET 2.
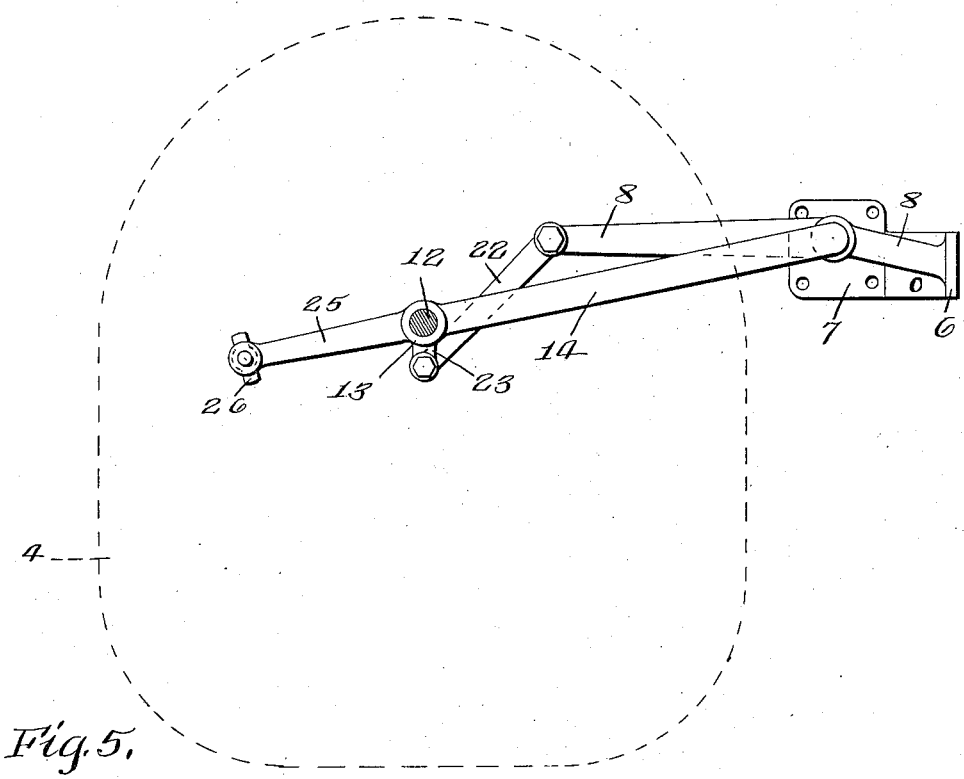
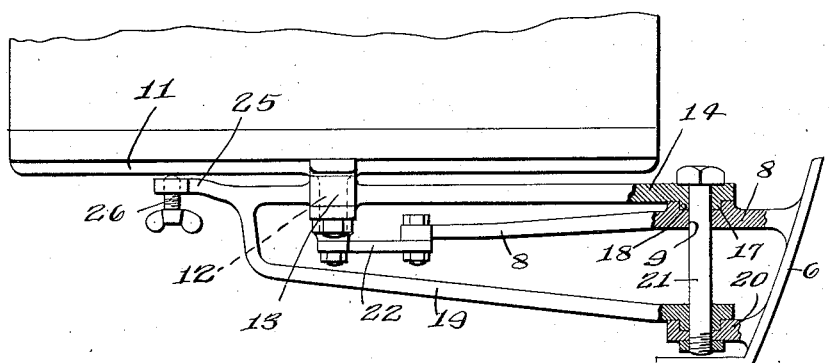
Witnesses:
Chas. H. Young
J. B. Pickard
Inventor
William H. Emond,
By Attorneys
Parron Hall & Bodell

UNITED STATES PATENT OFFICE.

WILLIAM H. EMOND, OF SYRACUSE, NEW YORK.

MOTOR-VEHICLE BODY AND SEAT ARRANGEMENT.

1,250,155.  Specification of Letters Patent.  Patented Dec. 18, 1917.

Application filed June 13, 1913. Serial No. 773,461.

*To all whom it may concern:*

Be it known that I, WILLIAM H. EMOND, of Syracuse, in the county of Onondaga and State of New York, have invented a new and useful Motor-Vehicle Body and Seat Arrangement, of which the following is a specification.

My invention relates to vehicle bodies and particularly to the seats and seat arrangement thereof, and its object is to provide a simple and desirable arrangement particularly advantageous in an automobile body.

The invention is illustrated in the accompanying drawings, wherein:—

Fig. 4 is a plan view of said seat supporting mechanism showing the parts in a third position of the seat; the outline of the seat being indicated by dotted lines; and Fig. 5 is an elevation with parts in section of a modified form of the invention.

Figure 1:
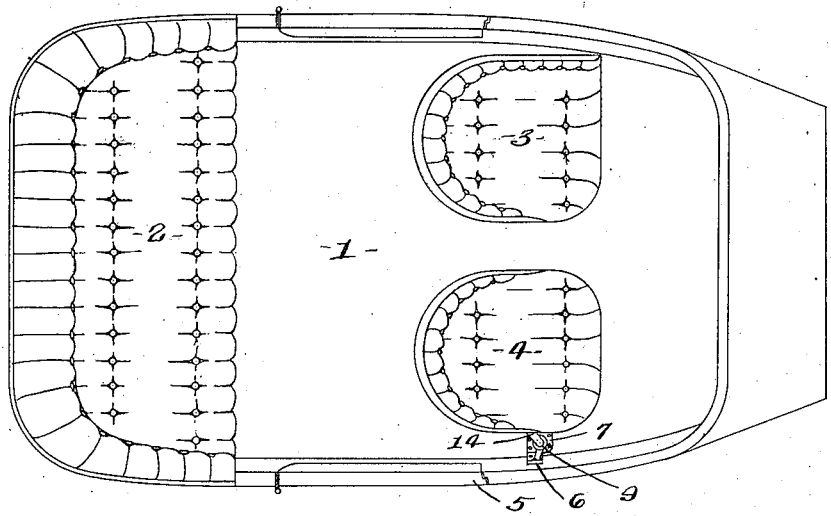
Figure 1 is a plan view of a vehicle body embodying the invention.

The invention is particularly designed for embodiment in an automobile body wherein the available seating space is relatively small, or contracted, and comprises a vehicle body formed with a doorway in one side thereof, a pair of front seats, and a rear seat, the front seats being spaced apart to form a passageway between them and the seat nearest the door being arranged to normally partially obstruct the passage to the doorway and being movable out of its normal position to leave the doorway substantially unobstructed whereby substantially unobstructed entrance is had to the rear seat through the doorway and to the front seats through said passage between the front seats. Usually, there is a door on each side of the body.

In the illustrated exemplification of the invention the body is designated 1 and includes two sides in one of which is located a door-way 5. A rear seat 2 extends from side to side of the body.

In the front part of the body are individual seats 3, 4, located adjacent the sides of the body and separated from each other by a relatively narrow space.

The seat 3 is designed to be occupied by the driver of the vehicle, and is preferably fixedly secured in position. The seat 4 is designed to be occupied by a passenger, is provided with a fixed back, and when in its normal position, shown in Fig. 1, the rear portion thereof extends in front of the doorway 5, and partly obstructs the same, or interference with the free use thereof.

The seat 4 is designed to occupy a plurality of positions lengthwise of the body and to be reversed for facing the same in different directions, thus permitting it to be shifted out of alinement with the entranceway 5 and also permitting it to occupy a plurality of positions in reference to the seat 2.

Figure 3:
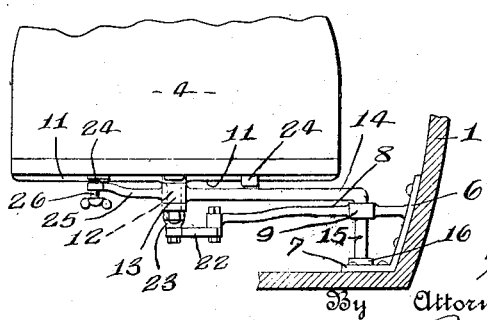
Fig. 3 is an end elevation of the parts shown in Fig. 2.

The means for supporting seat 4 and for shifting it lengthwise of the body and simultaneously rotating it about a vertical axis for changing the direction in which it faces, includes a support 14 pivotally mounted at one end in a bracket 6 preferably secured to the adjacent side of the vehicle contiguous to the floor. As shown in Fig. 3, the support 14 is provided with a vertically disposed extension 15 stepped at its lower end in a socket 16, formed in the base 7 of the bracket 6, and movable adjacent its upper end in a bearing provided in an arm 8 projecting laterally from the bracket. As shown in Fig. 5, the support includes parallel arms provided with depending bosses 17 journaled in complemental sockets in said arm 8, and a lug 20, projecting laterally from the bracket 6. The engaging parts are provided with registering openings for receiving a retaining bolt 21.

The means for pivotally mounting the support may be otherwise constructed, but preferably the axis 9 on which the support 14 swings, is vertically disposed and is arranged contiguous one side of the seat, when the latter is facing either toward the front or the rear of the body, and adjacent the side of the body provided with the door-way 5.

A stud 12 rigid with the seat and depending therefrom at a point a distance from its rear edge and substantially midway between its sides, extends through a bearing or socket located in the supporting member 14, a distance from the axis 9, and forms a swivel for the seat.

A link 22 is pivotally connected at one end to a fixed support located out of the path of movement of the support 14, and preferably in advance of the axis 9 and in a vertical plane perpendicular to the adjacent side of the body and intersecting said axis. As illustrated herein, this support is provided by an extension of the arm 8.

The opposite end of the link 22 is pivotally connected directly to an arm 23 extending laterally from the lower end of the stud 12. The axis of the connection between the arm 23 and link 22 is preferably located in advance of the swivel connection between the seat and support 14, and in a vertical plane intersecting the latter and the middle of the back of the seat.

The described parts are preferably so proportioned that the distance between the axis 9 and the swivel connection plus the distance between the latter and the connection of the link 22 to the arm 23 is substantially equal to the distance between the last-named connection and the point of connection of the link to the fixed support plus the distance between this connection and the axis 9.

That is to say, in the illustrated embodiment of my invention, the combined length of the support 14 and arm 23 is equal to the length of link 22 plus that of the aforesaid extension of the arm 8.

Figure 2:
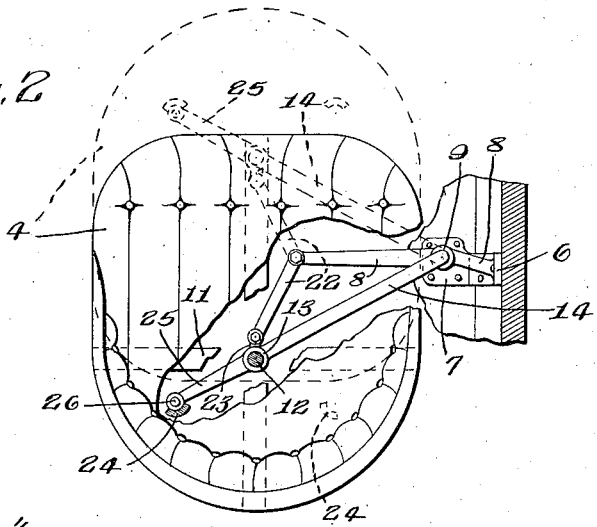
Fig. 2 is a plan view of one of the seats thereof and the supporting and shifting mechanism therefor; a portion of the seat being broken away, and the position of the parts in a reverse position of the seat being indicated by dotted lines.

With the described arrangement and the parts in the position illustrated in Figs. 1 and 2, by full lines, one desiring to enter the body through the door-way 5, will grasp the back of the seat 4 and rotate it in an anti-clockwise direction, or toward the side of the body, or he will push the seat in a forward direction, and in either action, the seat will be shifted forwardly into the position indicated by dotted lines in Fig. 2, and will be simultaneously reversed, so that instead of facing in the direction of the front of the vehicle, it will face the rear seat 2. In this movement the seat 4 will be shifted entirely out of line with the door-way 5.

The passenger may occupy seat 4 when it is in the position indicated by dotted lines in Fig. 2, but should he prefer to move nearer to the rear seat 2 and still face the same, he can bring the seat into the position indicated by dotted lines in Fig. 4. The seat is shifted into that position by first moving it into a central or neutral position, wherein all of the described pivotal points, or axes thereof, will be in a vertical plane substantially perpendicular to the side of the body. Normally, with the seat in this position, the back thereof will be presented to the side of the body and the front thereof toward the seat 3. By now turning the seat in an anti-clockwise direction and simultaneously swinging it on the support 14 slightly toward the rear seat 2, the parts will assume the position indicated in Fig. 4.

For arresting the movement of the seat when it reaches either of its two extreme positions, two projections 24 are located on the under side of the seat which coöperate with a stop 25 formed on an extension of the swinging support 14.

For locking the parts against accidental movement, the stop 25 consists of, or is provided with, a hand-operated screw, the end of which is designed to be forced against the bottom of the seat.

What I claim is:—

1. In combination, in a vehicle body formed with a door way in one side thereof, a pair of front seats and a rear seat, the front seats being spaced apart to form a passageway between them and the seat nearest the door being arranged to normally partially obstruct the passage to the doorway and being movable out of its normal position to leave the doorway substantially unobstructed whereby unobstructed entrance is had to the rear seat through the doorway and to the front seats through said passage between the front seats, substantially as and for the purpose described.

2. In combination, in a vehicle body, formed with a doorway in one side thereof, a support movable horizontally, forwardly and rearwardly, said support being pivoted to the body at one side of the doorway, and a seat swiveled to the support, the seat being normally arranged in position to partially obstruct the passage through the doorway and being movable by the support forwardly out of said position whereby a temporary unobstructed passage through the doorway is provided, and means for turning the seat during the forward and rearward movement of the support whereby the seat faces rearwardly when in its forward position and forwardly when in its rear position, substantially as and for the purpose set forth.

3. In combination, in a vehicle body formed with a doorway in one side thereof, a seat in the rear of the doorway, a supporting bracket arranged in front of the doorway and being fixed to the body, a support movable horizontally, forwardly and rearwardly, said support being pivoted to the bracket, a seat swiveled to the support, and being normally arranged in position to partially obstruct the passage through the doorway, and being movable by the support forwardly out of position to obstruct said passage whereby an unobstructed passage is provided between the front and rear seats, and means for swiveling the seat during the forward and rearward movement of the support whereby the seat faces rearwardly when in its forward position and forwardly when in its rear position, said means including a link pivoted at one end to said fixed bracket and at its other end to the seat eccentric to the axis thereof, substantially as and for the purpose described.

In testimony whereof, I have hereunto signed my name in the presence of two attesting witnesses, at Syracuse, in the county of Onondaga, in the State of New York, this 10th day of June, 1913.

WILLIAM H. EMOND.

Witnesses:
S. DAVIS,
G. B. PICKARD.